US012237577B2

(12) United States Patent
Chang et al.

(10) Patent No.: US 12,237,577 B2
(45) Date of Patent: Feb. 25, 2025

(54) CAVITY-BACKED SLOT ANTENNA SYSTEM

(71) Applicant: ASUSTeK COMPUTER INC., Taipei (TW)

(72) Inventors: Shih-Hsun Chang, Taipei (TW); Wei-Lin Tsai, Taipei (TW); Zhi-Zeng Cheng, Taipei (TW); You-Fu Cheng, Taipei (TW); Tsung-Hsun Hsieh, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 253 days.

(21) Appl. No.: 17/949,277

(22) Filed: Sep. 21, 2022

(65) Prior Publication Data

US 2023/0122470 A1 Apr. 20, 2023

(30) Foreign Application Priority Data

Oct. 20, 2021 (TW) ................................ 110212376

(51) Int. Cl.
*H01Q 13/18* (2006.01)
*H01Q 1/22* (2006.01)
*H01Q 5/378* (2015.01)

(52) U.S. Cl.
CPC ........... *H01Q 13/18* (2013.01); *H01Q 1/2266* (2013.01); *H01Q 5/378* (2015.01)

(58) Field of Classification Search
CPC ................. H01Q 1/243; H01Q 1/2266; H01Q 5/378-392; H01Q 7/00; H01Q 13/18
See application file for complete search history.

(56) References Cited

U.S. PATENT DOCUMENTS 5,914,693 A * 6/1999 Takei ..................... H01Q 13/18 343/771
6,304,226 B1 * 10/2001 Brown ................... H01Q 13/18 343/768
9,270,017 B2 * 2/2016 Villarroel ............. H01Q 1/3275
9,543,660 B2 * 1/2017 Rajagopalan .......... H01Q 9/045
2015/0255851 A1 * 9/2015 Guterman ................ H01Q 9/42 343/702
2020/0153080 A1 * 5/2020 Camacho Perez ....... H01Q 3/01

FOREIGN PATENT DOCUMENTS

CN 201378629 Y 1/2010
CN 106716712 B 5/2017

* cited by examiner

*Primary Examiner* — Dameon E Levi
*Assistant Examiner* — Leah Rosenberg
(74) *Attorney, Agent, or Firm* — McClure, Qualey & Rodack, LLP

(57) ABSTRACT

A cavity-backed slot antenna system provided in this disclosure is installed in a housing of an electronic device and includes a metal cavity, a supporting element, an antenna device, a conductive post, and a coupling metal part. The metal cavity is in the housing and includes an opening and a closed surface opposite to each other. A slot is on the closed surface. The supporting element is in the metal cavity. The antenna device is in the metal cavity and on the supporting element, to expose one side surface of the antenna device. The antenna device includes a feed source. The conductive post penetrates the antenna device and connects to the metal cavity. The coupling metal part is in the housing and close to the opening of the metal cavity, so that the coupling metal part is close to and corresponds to the feed source of the antenna device.

14 Claims, 7 Drawing Sheets

CAVITY-BACKED SLOT ANTENNA SYSTEM

CROSS-REFERENCE TO RELATED APPLICATION

This application claims the priority benefit of Taiwan application serial No. 110212376, filed on Oct. 20, 2021. The entirety of the above-mentioned patent application is hereby incorporated by reference herein and made a part of the specification.

BACKGROUND OF THE INVENTION

Field of the Invention

The disclosure relates to a built-in miniaturized cavity-backed slot antenna system.

Description of the Related Art

Nowadays, consumers have increasingly high requirements on the appearance of products, and the metal case has a great advantage in terms of mechanical strength, heat dissipation and appearance. Therefore, more manufacturers are designing wireless mobile devices with metal cases in response to the market demand. However, the metal case tends to shield the internal antenna radiation signal and is not easy to achieve broadband operation. Therefore, many manufacturers arrange a slot or metal frame breakpoint on the metal case, which further affects the aesthetic appearance of the product.

On the other hand, for the cavity-backed slot antenna, the slot is arranged on the side edge and covered by the design process, so as to prevent consumers from directly viewing the slot from the outside, which greatly increases the aesthetics of the product. Moreover, because the cavity-backed slot antenna is easily attached or co-constructed with metal mechanical components, this antenna design is commonly found on metal platform vehicles such as automotive, aerospace, marine and military vehicles. However, compared with other types of antennas, the biggest disadvantage of the conventional cavity-backed slot antenna is that the cavity is excessive in the overall size and is difficult to be embedded. Therefore, the design of the cavity-backed slot antenna is rarely applied to wireless mobile devices that need to be light and thin.

In order to reduce the size of the conventional cavity-backed slot antenna, the simplest and most common means of miniaturization is to fill the metal cavity with a medium such as a high dielectric or high permeability material to reduce the overall volume of the metal cavity and the size of the slot. However, the design method sharply reduces the antenna bandwidth and the antenna efficiency decreases. Moreover, the use of the high conductivity or high permeability material sharply increases the overall design costs of the antenna, which is detrimental to the antenna development.

BRIEF SUMMARY OF THE DISCLOSURE

According to an aspect of the disclosure, a cavity-backed slot antenna system installed in a housing of an electronic device is provided. The cavity-backed slot antenna system includes a metal cavity, a supporting element, an antenna device, a conductive post, and a coupling metal part. The metal cavity is located in the housing, and the metal cavity includes an opening and a closed surface opposite to each other, and a slot is arranged on the closed surface. The supporting element is located in the metal cavity. The antenna device is located in the metal cavity and on the supporting element, to expose one side surface of the antenna device from the slot, and the antenna device includes a feed source. The conductive post penetrates the antenna device and extends and connects to the metal cavity. The coupling metal part is located in the housing and close to the opening of the metal cavity so that the coupling metal part corresponds to the feed source of the antenna device.

To sum up, the disclosure relates to a design of a built-in miniaturized cavity-backed slot antenna system applicable to a metal case. In addition to effectively reducing an overall size of the whole cavity-backed slot antenna system, the antenna design in the disclosure is easy to resist the coupling of metal elements in the surrounding environment, and achieves the operating bandwidth of both a low-frequency band (2400 to 2480 MHz) and a high-frequency band (5150 to 7150 MHz) of a wireless local area network (WLAN), so as to achieve the purpose of miniaturization and broadband.

DETAILED DESCRIPTION OF THE EMBODIMENTS

Figure 1:
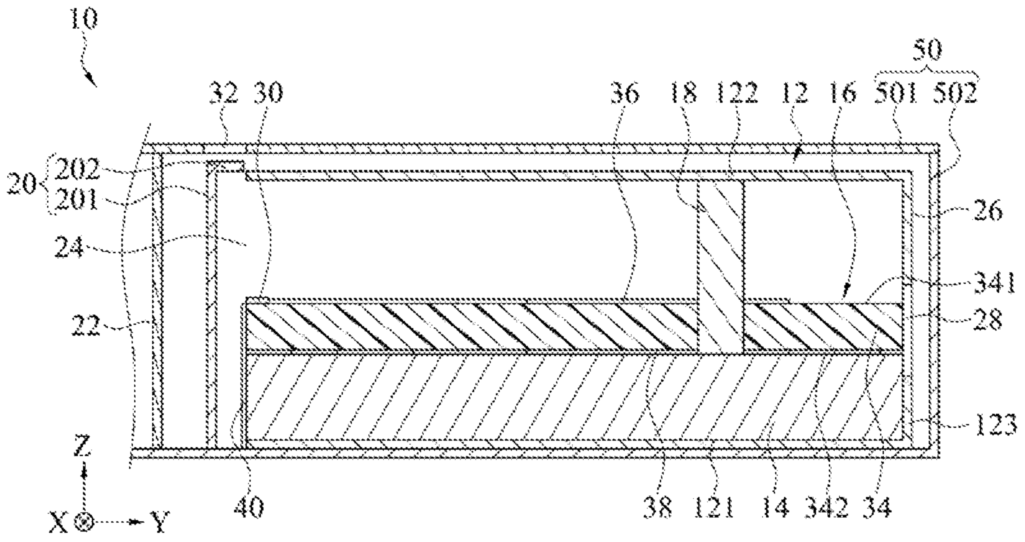
FIG. 1 is a structural cross-sectional view of a cavity-backed slot antenna system according to an embodiment of the disclosure.
Figure 2:
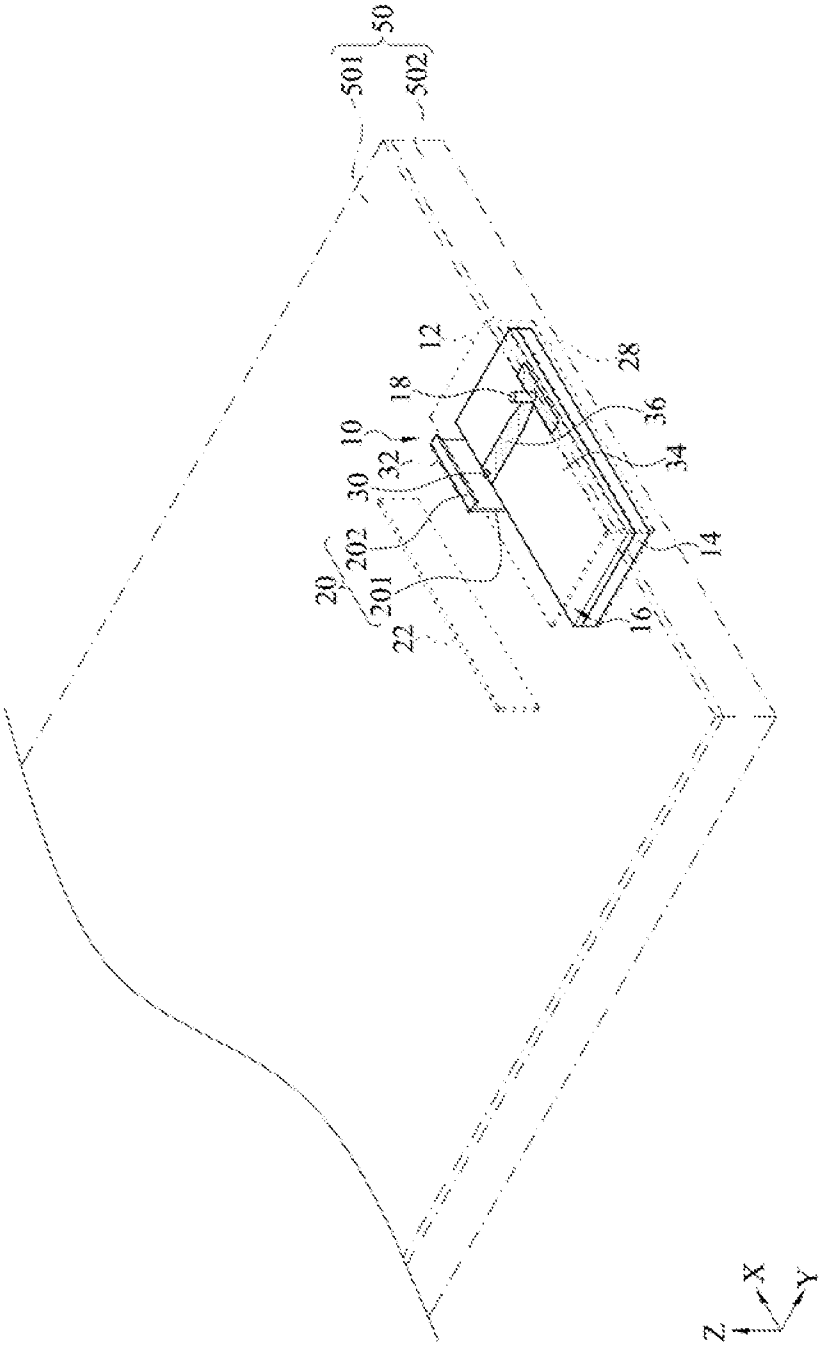
FIG. 2 is a schematic 3D structural view of a cavity-backed slot antenna system according to an embodiment of the disclosure.

Referring to FIG. 1 and FIG. 2 together, a built-in miniaturized cavity-backed slot antenna system 10 of the disclosure is installed in a housing 50 of an electronic device, the housing 50 includes an upper housing 501 and a lower housing 502, and the upper housing 501 and the lower housing 502 are assembled together. The cavity-backed slot antenna system 10 includes a metal cavity 12, a supporting element 14, an antenna device 16, a conductive post 18, a coupling metal part 20, and a metal wall 22.

In an embodiment, the electronic device is a notebook computer. In this case, the housing 50 is composed of a keyboard top cover (commonly known as C part) and a keyboard base (commonly known as D part), that is, the upper housing 501 is the keyboard top cover and the lower housing 502 is the keyboard base, so that the cavity-backed slot antenna system 10 is installed on the lower housing 502 of the housing 50. In another embodiment, the cavity-backed slot antenna system 10 is installed upside down on the upper housing 501 of the housing 50.

As shown in FIG. 1 and FIG. 2, in the cavity-backed slot antenna system 10, the metal cavity 12 is arranged in the housing 50 and on an inner surface of the lower housing 502, and the metal cavity 12 includes an opening 24 and a closed surface 26 opposite to each other. The opening 24 faces an interior of the housing 50, while the closed surface 26 is close to and faces a side wall of the housing 50 (the lower housing 502), and a slot 28 is arranged on the closed surface 26. In an embodiment, a size of the slot 28 is a length of half a wavelength of a working band of the antenna. The supporting element 14 is located in the metal cavity 12 and is made of a non-conductive material. The antenna device 16 is also located in the metal cavity 12 and on the supporting element 14, to expose one side surface of the antenna device 16 from the slot 28, and the antenna device 16 includes a feed source 30. The conductive post 18 is located in the metal cavity 12. The conductive post 18 penetrates the antenna device 16 and extends and connects to an inner wall of the metal cavity 12, so that the conductive post 18 electrically connects the antenna device 16 and the metal cavity 12. The coupling metal part 20 is located in the housing 50 and on an inner surface of the lower housing 502. The coupling metal part 20 is close to the opening 24 of the metal cavity 12 to correspond to the feed source 30 of the antenna device 16. An antenna window 32 is further arranged on the upper housing 501 of the housing 50 and at a position on a projection plane of the coupling metal part 20 on the upper housing 501, so that the coupling metal part 20 transmits wireless signals through the antenna window 32. The metal wall 22 is located in the housing 50 and on an outer side of the coupling metal part 20. A height of the metal wall 22 is greater than a height of the coupling metal part 20 to block signal interference from a system end of the electronic device.

In an embodiment, the coupling metal part 20 further includes a vertical metal portion 201 and a horizontal metal portion 202, one side edge of the vertical metal portion 201 is connected to the lower housing 502 of the housing 50, and the other side edge is vertically connected to the horizontal metal portion 202, so that the horizontal metal portion 202 corresponds to the antenna window 32, and a size of the antenna window 32 is greater than or equal to a size of the horizontal metal portion 202 of the coupling metal part 20.

Figure 3:
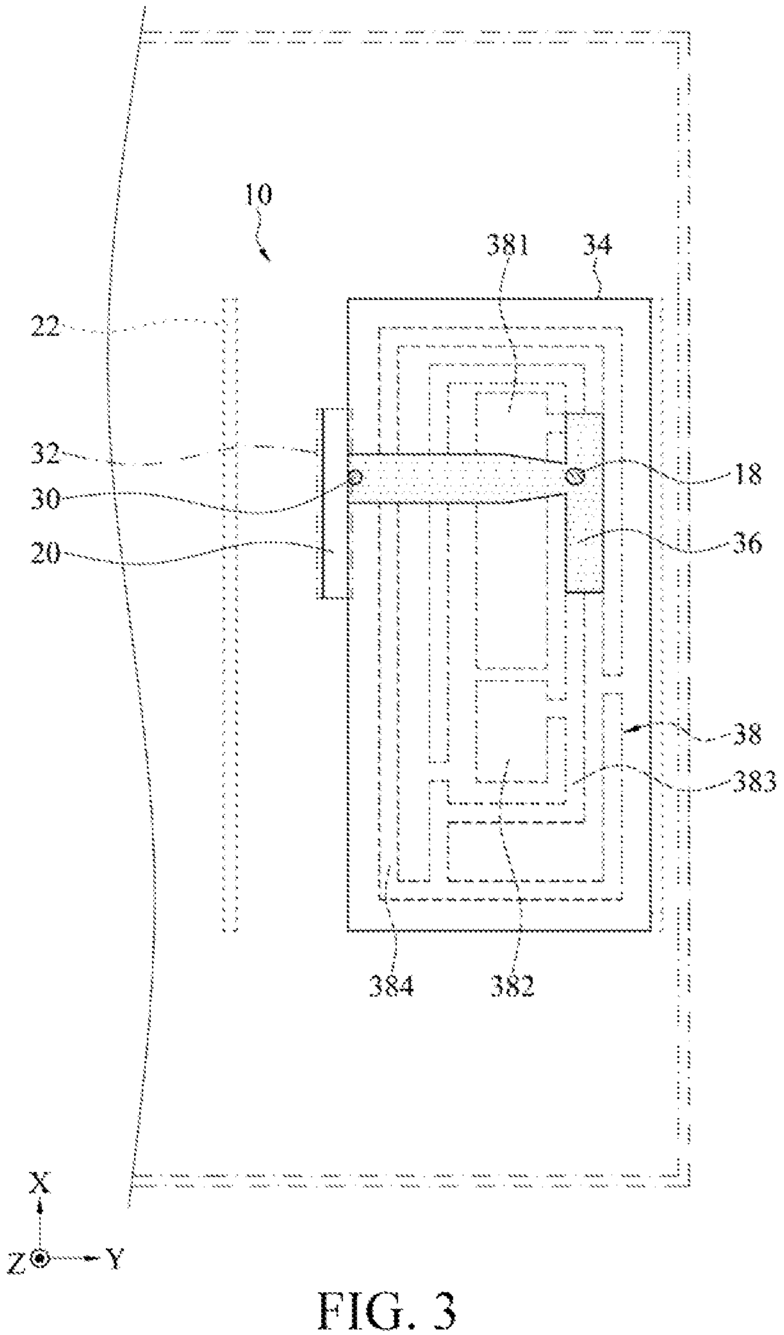
FIG. 3 is a schematic structural view of an antenna device of a cavity-backed slot antenna system according to an embodiment of the disclosure.
Figure 4:
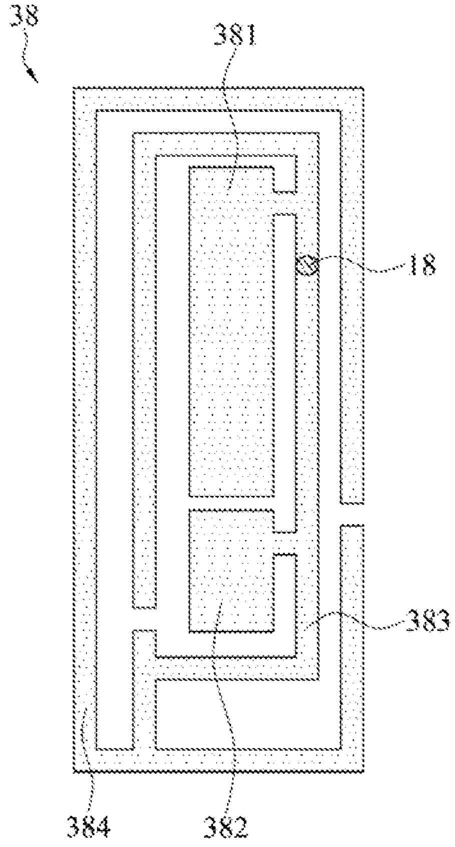
FIG. 4 is a schematic structural view of a parasitic loop circuit of an antenna device according to an embodiment of the disclosure.

In an embodiment, referring to FIG. 1 to FIG. 4 together, the antenna device 16 includes a substrate 34, a feed strip line 36, the feed source 30, and a parasitic loop circuit 38. The substrate 34 is a printed circuit board (PCB) and includes a first surface 341 and a second surface 342 which are up and down opposite. The feed strip line 36 is located on the first surface 341 of the substrate 34. The feed source 30 is also located on the first surface 341 of the substrate 34 and is close to the coupling metal part 20, and the feed source 30 is electrically connected to the feed strip line 36. The parasitic loop circuit 38 is located on the second surface 342 of the substrate 34. The conductive post 18 penetrates the substrate 34, the feed strip line 36, and the parasitic loop circuit 38, and extends upward to the metal cavity 12, so that the conductive post 18 electrically connects the feed strip line 36, the parasitic loop circuit 38, and the metal cavity 12. In an embodiment, the structure design of the feed strip line 36 and the parasitic loop circuit 38 is not limited in the disclosure, and the feed strip line 36 is T-shaped as shown in FIG. 3. The parasitic loop circuit 38 is designed as the circuit shown in FIG. 4. The parasitic loop circuit 38 includes a first metal portion 381, a second metal portion 382, a first metal loop 383, and a second metal loop 384. The first metal loop 383 surrounds a periphery of the first metal portion 381 and the second metal portion 382 and connects the first metal portion 381 and the second metal portion 382. The second metal loop 384 surrounds a periphery of the first metal loop 383 and connects to the first metal loop 383 to form the parasitic loop circuit 38. However, the structure design is not limited in the disclosure, and other circuit patterns care also available. In this embodiment, the conductive post 18 penetrates the first metal loop 383 of the parasitic loop circuit 38.

In an embodiment, referring to FIG. 1 to FIG. 2 together, in the cavity-backed slot antenna system 10, the metal cavity 12 further includes a metal bottom plate 121, a metal cover plate 122, and a metal side plate 123. The metal bottom plate 121 is located below the supporting element 14, the metal cover plate 122 is located above the antenna device 16, and the metal side plate 123 is located at a periphery between the metal bottom plate 121 and the metal cover plate 122, so that the metal bottom plate 121, the metal cover plate 122, and the metal side plate 123 are connected to each other to form the metal cavity 12, and the opening 24 and the closed surface 26 opposite to each other are formed, so that the slot 28 on the closed surface 26 (the metal side plate 123) corresponds to and exposes the antenna device 16, and the opening 24 corresponds to the coupling metal part 20.

To enhance a grounding effect, the cavity-backed slot antenna system 10 further includes a metal layer 40 located on a side wall of the antenna device 16 and extending downward from the feed source 30 to connect to the metal bottom plate 121 of the metal cavity 12, so as to electrically connect the feed source 30 to the metal bottom plate 121 for grounding.

Figure 5:
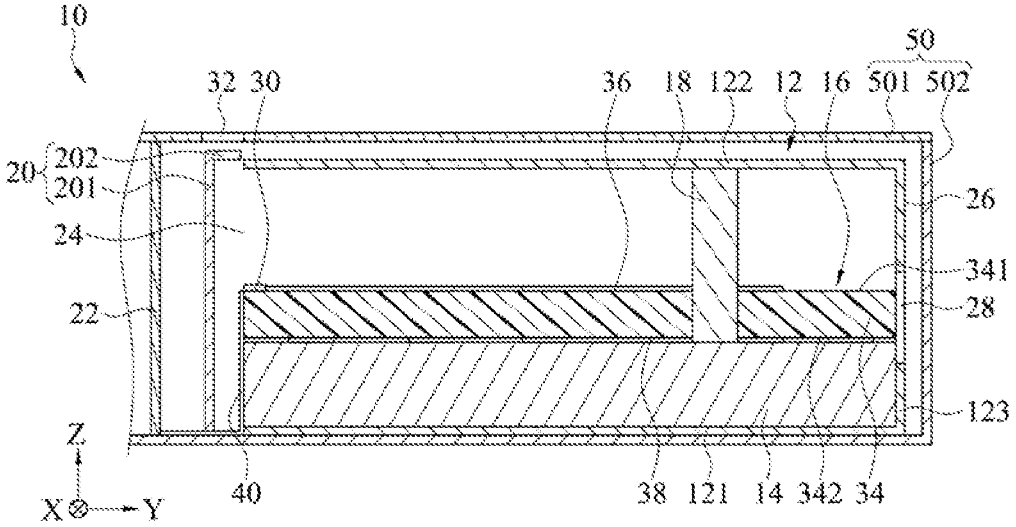
FIG. 5 is a structural cross-sectional view of a cavity-backed slot antenna system according to another embodiment of the disclosure.

In another embodiment, referring to FIG. 5, the cavity-backed slot antenna system 10 further includes a metal layer 40 located on a side wall of the antenna device 16, and after extending downward from the feed source 30 to connect to the metal bottom plate 121 of the metal cavity 12, the metal layer 40 further extends below the coupling metal part 20, so that a side edge of the vertical metal portion 201 of the coupling metal part 20 is connected to the metal layer 40 to electrically connect both the feed source 30 and the coupling metal part 20 to the metal bottom plate 121 for grounding.

Figure 6:
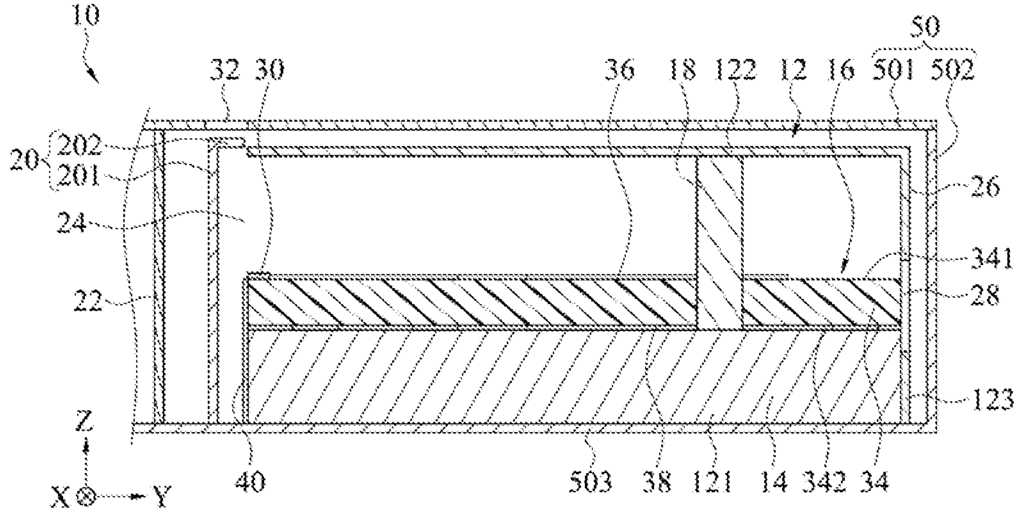
FIG. 6 is a structural cross-sectional view of a cavity-backed slot antenna system according to still another embodiment of the disclosure.

In an embodiment, referring to FIG. 6, in the cavity-backed slot antenna system 10, the metal bottom plate used for the metal cavity 12 is a metal bottom surface 503 at the bottom of the housing 50, that is, the metal bottom surface 503 of the lower housing 501 is used as a part of the metal cavity 12. As shown in FIG. 6, the metal cavity 12 further includes a metal bottom plate 121, a metal cover plate 122, and a metal bottom surface 503, the supporting element 14 is directly located on a surface of the metal bottom surface 503, the metal cover plate 122 is located above the antenna device 16, and the metal side plate 123 is located at a periphery between the metal bottom surface 503 and the metal cover plate 122, so that the metal bottom surface 503, the metal cover plate 122, and the metal side plate 123 are connected to each other to form the metal cavity 12 for accommodating the supporting element 14, the antenna device 16, and the conductive post 18, and the opening 24 and the closed surface 26 are formed, so that the slot 28 on the closed surface 26 (the metal side plate 123) corresponds to and exposes the antenna device 16, and the opening 24 corresponds to the coupling metal part 20. In this embodiment, the metal layer 40 is located on a side wall of the antenna device 16 and extends downward from the feed source 30 to connect to the metal bottom surface 503 of the metal cavity 12, so as to electrically connect the feed source 30 to the metal bottom surface 503 for grounding. The rest of the structure is the same as that in the cavity-backed slot antenna system 10 shown in FIG. 1, and no repeated description is provided.

Figure 7:
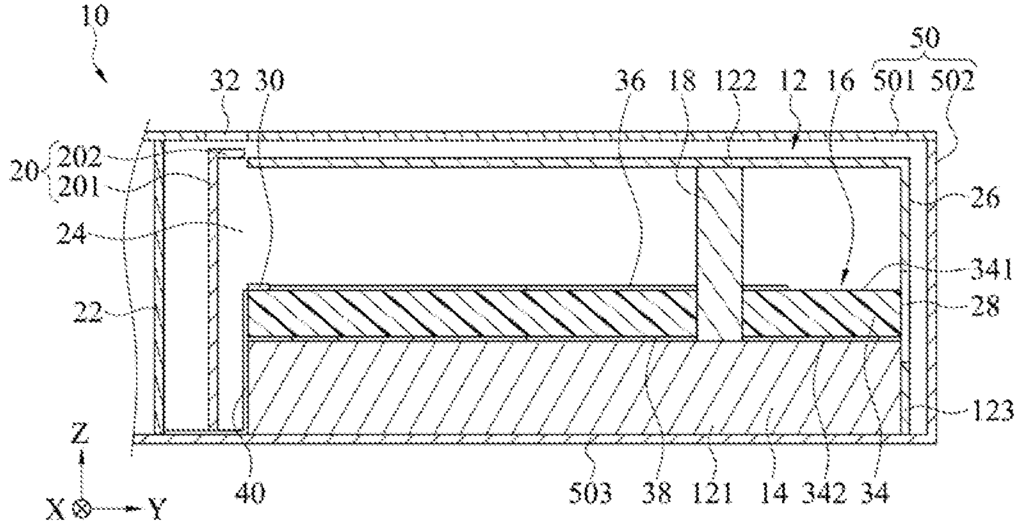
FIG. 7 is a structural cross-sectional view of a cavity-backed slot antenna system according to yet another embodiment of the disclosure.

In another embodiment, referring to FIG. 7, the metal layer 40 in the cavity-backed slot antenna system 10 is located on a side wall of the antenna device 16, and after extending downward from the feed source 30 to connect to the metal bottom surface 503 of the metal cavity 12, the metal layer 40 further extends below the coupling metal part 20 along the metal bottom surface 503, so that a lower side edge of the vertical metal portion 201 of the coupling metal part 20 is connected to the metal layer 40, to electrically connect both the feed source 30 and the coupling metal part 20 to the metal bottom surface 503 for grounding.

Figure 8:
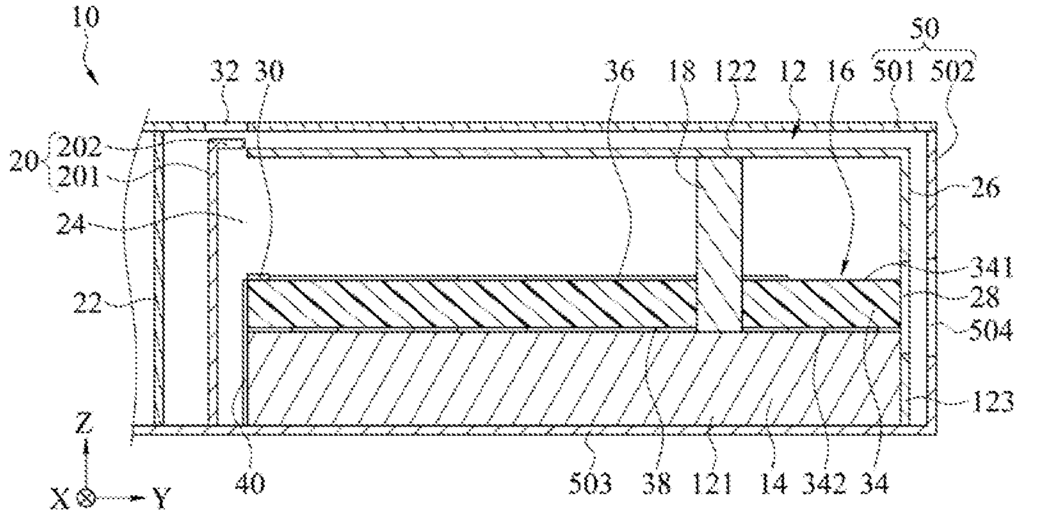
FIG. 8 is a structural cross-sectional view of a cavity-backed slot antenna system according to yet another embodiment of the disclosure.
Figure 9:
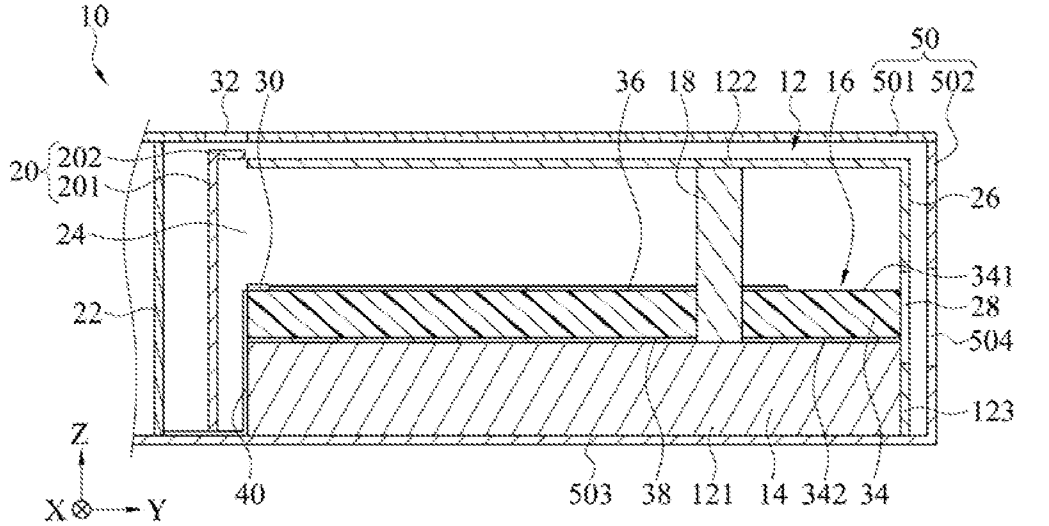
FIG. 9 is a structural cross-sectional view of a cavity-backed slot antenna system according to yet another embodiment of the disclosure.

In an embodiment, as shown in FIG. 8 and FIG. 9, in the cavity-backed slot antenna system 10, if a side wall of the lower housing 502 in the housing 50 is a metal part or metal material, an antenna window 504 is arranged on a metal side wall of the lower housing 502 and at a position corresponding to the slot 28 to expose the slot 28 from the antenna window 504, so that the coupling metal part 20 transmits wireless signals through the slot 28 and the antenna window 504, thereby providing an energy radiation outlet in a high-frequency operating band to optimize a coverage ratio of a radiation field pattern. A size of the antenna window 504 is greater than or equal to the size of the slot 28. The rest of the structure is the same as that in the foregoing embodiment, and no repeated description is provided.

In an embodiment, as shown in FIG. 1 to FIG. 9, elements such as the metal cavity 12 (the metal bottom plate 121, the metal cover plate 122, and the metal side plate 123), the feed strip line 36 and the parasitic loop circuit 38 of the antenna device 16, the conductive post 18, the coupling metal part 20 (the vertical metal portion 201 and the horizontal metal portion 202), and the metal wall 22 are made of conductive metal materials, such as silver, copper, aluminum, iron or alloy thereof.

Referring to FIG. 1 to FIG. 9 together, using an example in which the antenna is applied to a WLAN, a low-frequency operating band (2400 to 2480 MHz) is operated in the low-frequency band by a 214 resonant mode formed by the feed source 30 and the coupling metal part 20 located near the feed source 30, and the antenna window 32 is arranged at the position on the projection plane above the coupling metal part 20 to provide an energy radiation outlet in the low-frequency operating band. A high-frequency operating band (5150 to 7150 MHz) is determined by a geometry size associated with the metal cavity 12 (including a length and a width of the slot 28 and a depth of the metal cavity 12), and is related to relative positions of the conductive post 18 and the feed source 30 with respect to the metal cavity 12 to operate in the high-frequency band. The high-frequency band in this embodiment is a $\lambda/2$ resonant mode.

Figure 10:
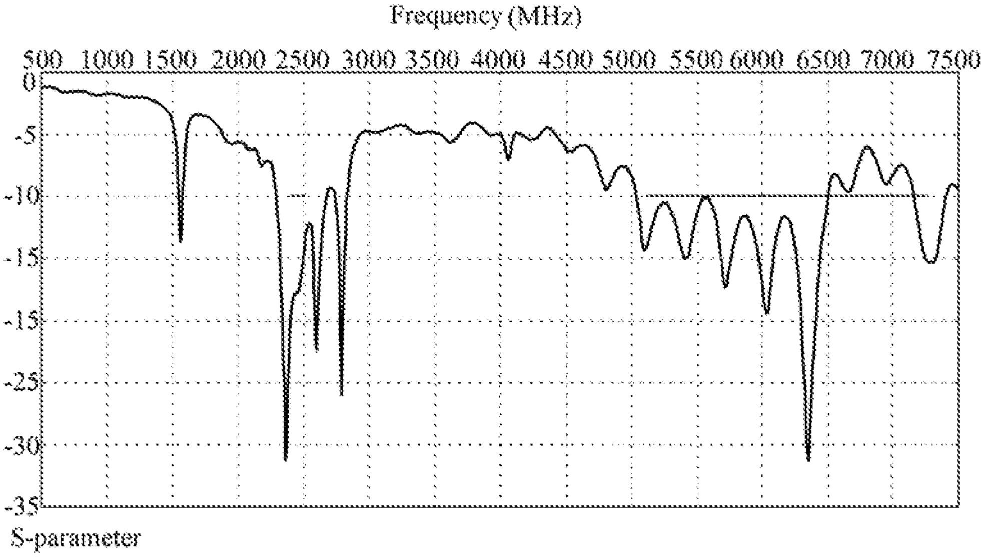
FIG. 10 is a schematic simulation diagram of S-parameter generated by the cavity-backed slot antenna system according to the disclosure.

The cavity-backed slot antenna system 10 provided in the disclosure does have a good return loss. Referring to FIG. 1 to FIG. 10, the cavity-backed slot antenna system 10 is used to perform simulation analysis of S-parameter when a radio frequency signal is transmitted. An S-parameter simulation result of the cavity-backed slot antenna system 10 in the low-frequency operating band (2400 to 2480 MHz) and the high-frequency operating band (5150 to 7150 MHz) are shown in FIG. 10. It is seen from the curve shown in the figure that, in the disclosure, most of the return loss (S-parameter) of an antenna resonance band shown in the low-frequency operating band and the high-frequency operating band is greater than 10 dB (S-parameter is less than −10 dB). The performance that the return loss is still greater than 6 dB (S-parameter is less than −6 dB) even in the high-frequency operating band from 6500 to 7150 MHz proves that the cavity-backed slot antenna system 10 has a good return loss in both the low-frequency operating band and the high-frequency operating band, so that the cavity-backed slot antenna system 10 is effectively applicable to both the low-frequency operating band (2400 to 2480 MHz) and the high-frequency operating band (5150 to 7150 MHz).

Miniaturized antennas are usually accompanied by extremely small input resistances and extremely high dummy sections, which leads to excessively narrow bandwidths. Compared with a metal planar slotted design, the cavity-backed slot antenna is usually accompanied by a narrower operating bandwidth. Therefore, a multistage impedance matching network is required to extend the multimode resonance to extend the bandwidth, but this method increases the design costs and results in poor antenna efficiency due to an additional loss introduced by the multistage matching network. In the disclosure, by adjusting the geometry size and structure of the feed strip line and the surrounding parasitic loop circuit in the antenna device in the metal cavity, the antenna structure generates additional capacitance and inductance value loads, and eliminates the characteristic of drastic reactance change accompanied by the miniaturized cavity-backed antenna, so as to obtain better impedance matching to further expand the antenna operation. Based on this, the cavity-backed slot antenna system provided in the disclosure covers the high-frequency working bandwidth of the WLAN while reducing the size of the metal cavity. Furthermore, the size of the slot on the metal cavity in the foregoing embodiment is the length of half the wavelength, which is reduced by about half compared with the length of the conventional cavity-backed slot which is slightly longer than one wavelength, and the depth of the metal cavity is reduced by less than a quarter of the wavelength. The overall size of the metal cavity is significantly reduced for a built-in antenna design.

To sum up, the disclosure relates to a design of a built-in miniaturized cavity-backed slot antenna system applicable to a metal case. In addition to effectively reducing an overall size of the whole cavity-backed slot antenna system, the antenna design in the disclosure is easy to resist the coupling of metal elements in the surrounding environment, and achieves the operating bandwidth of both a low-frequency band (2400 to 2480 MHz) and a high-frequency band (5150 to 7150 MHz) of a WLAN, so as to achieve the purpose of miniaturization and broadband.

The foregoing embodiments are only intended to illustrate the technical ideas and features of the disclosure, the purpose of which is to enable those familiar with this technology to understand the content of the disclosure and implement them accordingly but are not to limit the patent scope of the disclosure, that is, any equivalent change or modification made in accordance with the spirit disclosed in the disclosure shall also be encompassed in the patent scope of the disclosure.

What is claimed is:

1. A cavity-backed slot antenna system comprising:

a housing of an electronic device;

a metal cavity, located in the housing, wherein the metal cavity comprises an opening and a closed surface opposite to each other, and a slot is arranged on the closed surface;

a supporting element, located in the metal cavity;

an antenna device, located in the metal cavity and on the supporting element, to expose one side surface of the antenna device from the slot, wherein the antenna device comprises a feed source;

a conductive post, penetrating the antenna device and connecting to the metal cavity; and a coupling metal part, located in the housing and adjacent to the opening of the metal cavity, wherein the coupling metal part and the feed source of the antenna device form a resonant mode.

2. The cavity-backed slot antenna system according to claim 1, wherein the antenna device comprises:

a substrate, comprising a first surface and a second surface which are up and down opposite;

a feed strip line, located on the first surface of the substrate;

the feed source, located on the first surface of the substrate and electrically connected to the feed strip line; and a parasitic loop circuit, located on the second surface of the substrate, wherein the conductive post penetrates the substrate, the feed strip line, and the parasitic loop circuit, so that the conductive post electrically connects the substrate, the feed strip line, the parasitic loop circuit, and the metal cavity.

3. The cavity-backed slot antenna system according to claim 1, further comprising a metal wall located in the housing and on an outer side of the coupling metal part.

4. The cavity-backed slot antenna system according to claim 3, wherein a height of the metal wall is greater than a height of the coupling metal part.

5. The cavity-backed slot antenna system according to claim 1, wherein an antenna window is further arranged at a position on a projection plane of the coupling metal part on the housing.

6. The cavity-backed slot antenna system according to claim 5, wherein the coupling metal part further comprises a vertical metal portion and a horizontal metal portion, one side edge of the vertical metal portion is connected to the housing, and the other side edge is connected to the horizontal metal portion, so that the horizontal metal portion corresponds to the antenna window.

7. The cavity-backed slot antenna system according to claim 6, wherein a size of the antenna window is greater than or equal to a size of the horizontal metal portion of the coupling metal part.

8. The cavity-backed slot antenna system according to claim 1, wherein the metal cavity further comprises a metal bottom plate, a metal cover plate, and a metal side plate, the metal bottom plate is located below the supporting element, the metal cover plate is located above the antenna device, and the metal side plate is located at a periphery between the metal bottom plate and the metal cover plate to form the opening and the closed surface.

9. The cavity-backed slot antenna system according to claim 8, wherein the metal bottom plate is a metal bottom surface of the housing.

10. The cavity-backed slot antenna system according to claim 8, further comprising a metal layer located on a side wall of the antenna device and extending and connecting to the metal bottom plate of the metal cavity, to electrically connect the feed source to the metal bottom plate for grounding.

11. The cavity-backed slot antenna system according to claim 10, wherein the metal layer further extends below the coupling metal part, to electrically connect the coupling metal part to the metal bottom plate for grounding.

12. The cavity-backed slot antenna system according to claim 1, wherein a size of the slot is a length of half a wavelength of a working band.

13. The cavity-backed slot antenna system according to claim 1, wherein a side wall of the housing is a metal part and an antenna window is arranged on the side wall of the housing and at a position corresponding to the slot.

14. The cavity-backed slot antenna system according to claim 13, wherein a size of the antenna window is greater than or equal to a size of the slot.

* * * * *